UNITED STATES PATENT OFFICE.

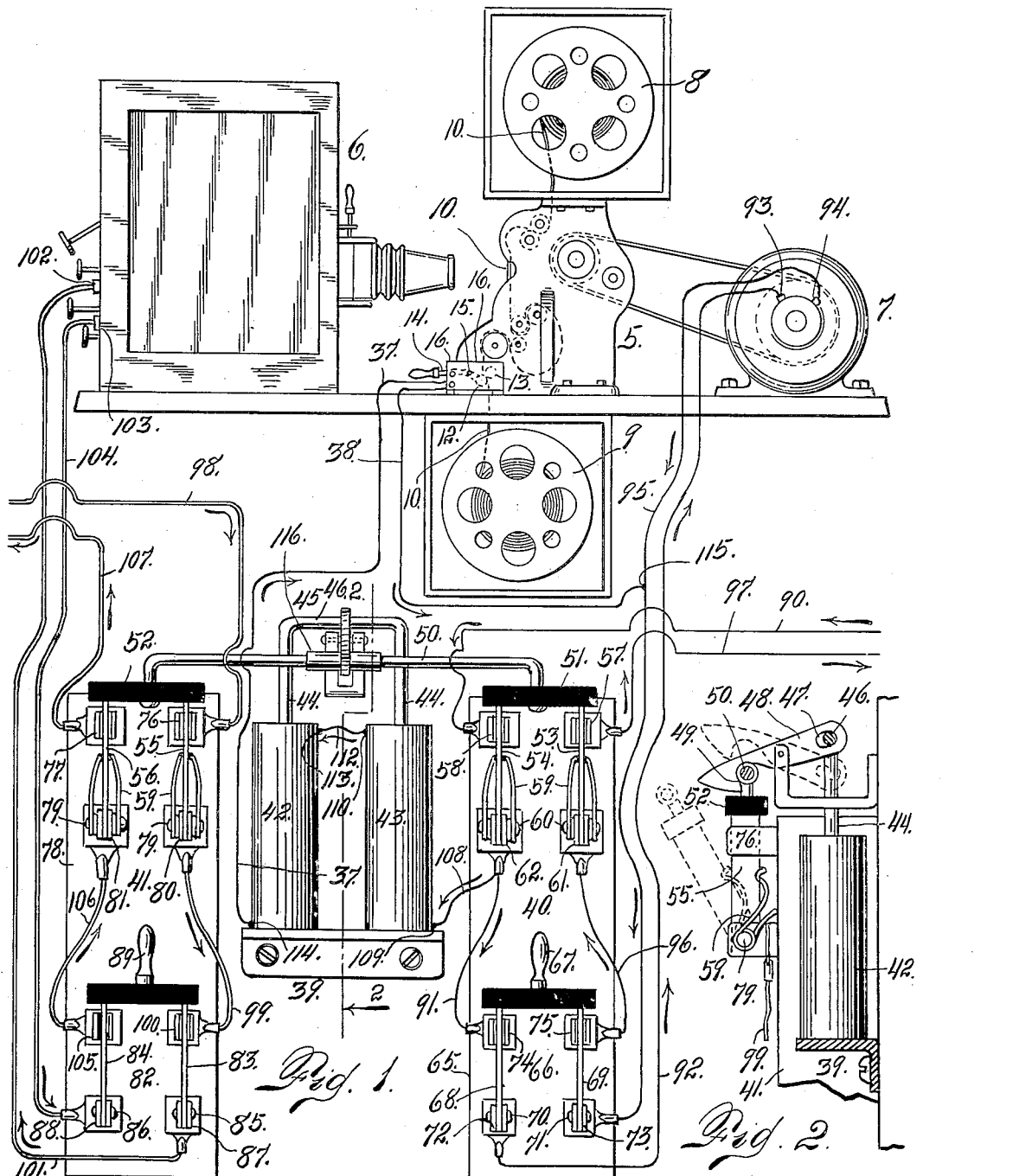

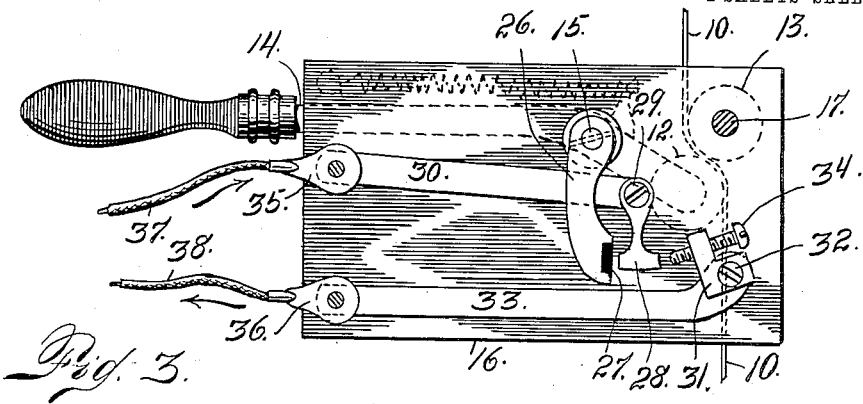
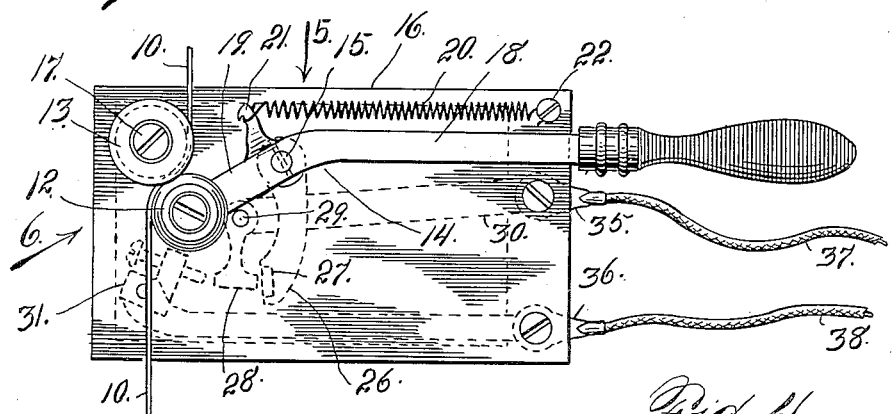
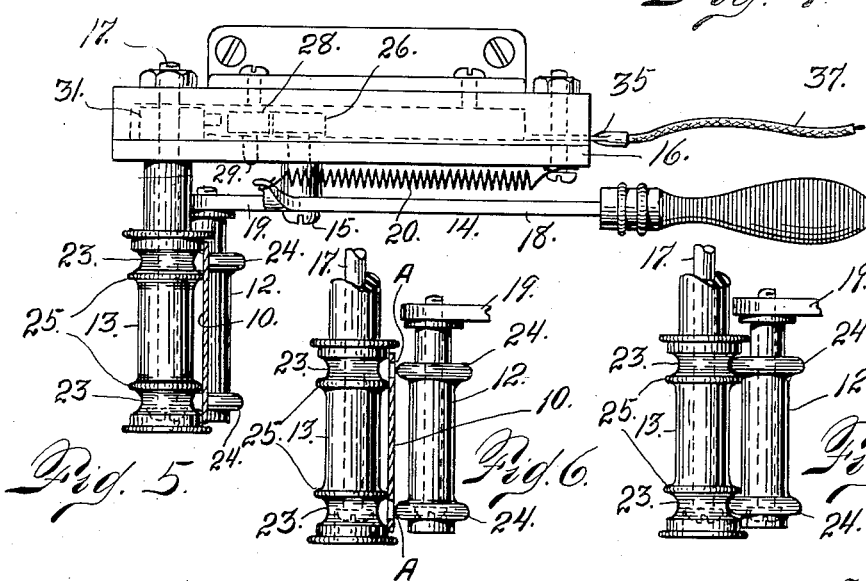

LEE ROY KENNEDY AND OSCAR B. OLSON, OF DENVER, COLORADO, ASSIGNORS, BY DIRECT AND MESNE ASSIGNMENTS, TO THE O. K. CONTROLLER COMPANY, A CORPORATION OF COLORADO.

AUTOMATIC MAKE-AND-BREAK DEVICE FOR PROJECTING-MACHINES.

1,127,775.      Specification of Letters Patent.      Patented Feb. 9, 1915.

Application filed July 24, 1913. Serial No. 780,890.

*To all whom it may concern:*

Be it known that we, LEE ROY KENNEDY and OSCAR B. OLSON, citizens of the United States, residing in the city and county of Denver and State of Colorado, have invented certain new and useful Improvements in Automatic Make-and-Break Devices for Projecting-Machines; and we do declare the following to be a full, clear, and exact description of the invention, such as will enable others skilled in the art to which it appertains to make and use the same, reference being had to the accompanying drawings, and to the characters of reference marked thereon, which form a part of this specification.

Our invention relates to improvements in means for automatically breaking the electric circuits in moving picture projecting machines, when the film breaks. It is well known that in machines of this character, the lenses through which the light from the arc lamp shines in order to reproduce the film pictures upon the canvas, are arranged directly in front and quite close to the exposed portion of the film containing the said pictures in miniature form. The light, after passing through these lenses or condensers is concentrated on the film, whereby a result similar to that obtained by the use of a sun glass follows, so that as soon as the film breaks and the travel of the part which is in front of the reproducing camera ceases to travel, the action of the rays of light concentrated upon the film will ignite the latter instantly. It is well known that moving picture films are highly inflammable, but during the operation of projecting the pictures upon the canvas during moving picture shows, the film when in regular operation travels so rapidly that it is immune from the action of these powerful rays of light.

The object of my present invention is to provide means whereby the electrical circuits which supply the motor and lamp are automatically broken the instant the film breaks; and to this end we provide a controller including a pair of rollers between which the film passes on its way to the rewinding spool or other depository to which the film passes after the pictures thereon have been reproduced upon the canvas by the projecting apparatus. These rollers are so arranged that one of them is movable and when the film is passing between them they are held in such position as to break the circuit through a solenoid or magnet which may be termed a relay. As soon however, as the film breaks, whereby it ceases to pass between these rollers, the movable roller moves into contact with its companion roller and in so doing brings a movable contact into engagement with a stationary contact and closes the relay circuit. As illustrated in the drawing, this relay is in the form of a solenoid whose cores act upon means whereby the latter are operated to release the contact arms forming parts of double pole switches or make and break devices located in the motor and lamp circuits, respectively. As soon as these arms are released, springs acting thereon disengage them from their coöperating contacts and instantly break both circuits, thus extinguishing the lamp and stopping the motor and preventing the possibility of fire due to the breaking of the film as heretofore explained. It must be understood that any suitable mechanism may be employed to accomplish the aforesaid result, the only indispensable feature being that the means employed for making and breaking the circuit shall be controlled by the film, the construction being such that as soon as the film breaks, the motor and lamp circuits are automatically and instantaneously broken.

Having briefly outlined our improved construction, we will proceed to describe the same in detail, reference being made to the accompanying drawing, in which is illustrated an embodiment thereof.

In this drawing—Figure 1 is a view illustrating in a general way the entire apparatus including the motor and lamp circuits and the switches or make and break devices together with the electro-magnetic means or relay, the circuit of which is normally broken by the film when the latter is intact, and operating in the regular way. Fig. 2 is a section taken on the line 2—2, Fig. 1 looking toward the left. Fig. 3 is a detail view illustrating the controller viewed from one side thereof and shown on a scale greatly enlarged as compared with its illustration in Fig. 1. Fig. 4 is a similar view but from the opposite side of the same device. Fig. 5 is a view looking in the direction of arrow 5, Fig. 4, the electrical contacts of the controller being incased. Fig. 6 is a detail view of the two coöperating rollers forming a part of the controller and between which the film passes during the regular operation of the projecting mechanism, the film being shown in position. Fig. 7 is a similar view with the film removed and showing the rollers in contact.

The same reference characters indicate the same parts in all the views.

Let the numeral 5 designate the operating mechanism or that employed for actuating the moving picture film during the operation of projecting the pictures for moving picture shows. As shown in the drawing, this mechanism is interposed between a lamp 6 and a motor 7 which are arranged on opposite sides, the motor being out of the path of projection; while above this mechanism is the spool 8 from which the film is being unwound during its travel for projecting purposes, the receiving spool 9 being located below the mechanism 5. The film which is designated by the numeral 10, after passing through or between the various rolls, regularly employed in controlling the same during the projecting operation, before passing to the receiving spool, travels between a pair of rollers 12 and 13, the roller 12 being mounted on one extremity of the lever 14 fulcrumed at 15 on a plate 16 of insulating material, while the roller 13 is mounted on a stationary spindle 17, also mounted on the insulating plate or base 16, the two spools being arranged in coöperative relation. There is a constant tendency by reason of the weight of the arm 18 of the lever 14 to throw the roller 12 into actual contact with the companion roller 13, since the arm 19 of the lever is relatively short. The tendency of the roller 12 to approach the roller 13 is further increased by the tension of a spiral spring 20 which is connected at one extremity with a lug 21 formed on the lever, while its opposite extremity is secured to the insulating base by a screw 22 or other suitable fastening device. The roller 13 is provided with circumferential grooves 23 arranged near the opposite ends thereof and adapted to receive circumferential ribs or beads 24 formed on the companion roller 12 when the two rollers are in contact; the roller 13 is further provided with circumferential ribs 25 adjacent the grooves whereby when the film 10 is interposed between the two rollers as is the case when the projecting mechanism is in regular operation, the two rollers are held at a considerable distance apart and consequently an appreciable movement occurs on the part of the roller 12 when the film breaks and passes from between the two rollers. The object of this arrangement is to separate the electrical contacts employed in the making and breaking of the circuit which is directly under the influence of the controlling mechanism. The fulcrum 15 of the lever 14 is a spindle to which the lever is made fast and upon one extremity of this spindle is also made fast an arm 26 whose extremity remote from the spindle is equipped with an insulating part 27 arranged to act upon a contact 28 loosely hung from a screw 29 which also serves to secure a contact member 30 to the insulating base. On the opposite side of the swinging contact 28, from that upon which the arm 26 is located, is arranged a contact member 31 which is secured by means of a screw 32 to a relatively long contact member 33. The contact 31 carries a screw 34 which is threaded therein and adjustable toward and away from the swinging contact 28. The two contact members 30 and 33 are connected by means of terminals 35 and 36 and electrical conductors 37 and 38, with electro-magnetic means 39 in a manner which will now be described. The electro-magnetic means 39, as illustrated in the drawing, is of the solenoid type, but it must be understood that the present invention is not limited to this type of device, since various other forms may undoubtedly be employed without in any way departing from the spirit of the invention.

Arranged in suitable proximity to the member 39 are two electrical switches 40 and 41. As shown in the drawing, these switches are arranged on opposite sides of the magnet 39. The solenoid is composed of two coil members 42 and 43 which are arranged to receive the arms 44 of a U-shaped movable core 45, the arms 44 being connected at their outer extremities by a transverse part 46. This transverse part passes through an elongated opening 47 formed in an arm 48 having a hook-shaped extremity 49 adapted to normally engage a rod 50 whose opposite extremities are equipped with insulating members 51 and 52, the member 51 being secured to two contact members 53 and 54 of the switch 40; while the insulating member 52 is secured to two contact members 55 and 56 of the switch 41. The members 53 and 54 engage spring contacts 57 and 58 respectively, each contact consisting of two separated parts between which the contact members 53 and 54 pass when the circuit is closed. These members 53 and 54 are each acted on by a spring 59 which has a tendency to disengage the said members from their coöperating contacts 57 and 58. When, however, the rod 50 is held in its normal position by the arm 48, the contact members 53 and 54 are held in engagement with the companion members 57 and 58 or in the circuit closing position. The springs 59 are mounted on pins 60 upon which the members 53 and 54 are pivoted or hinged. The springs may, of course, be mounted in any suitable manner. The pins 60 pass through separated contacts 61 and 62 secured to the insulating base 65 of the switch 40. Also mounted on the insulating base 40 is a hand operated make and break device 66 composed of an insulating handle 67, two contact members 68 and 69 connected as shown at 70 and 71 with contact parts 72 and 73, the contacts 68 and 69 engaging companion contacts 74 and 75 when the circuit is closed. The insulating member 52 carried by the rod 50, performs the same function with reference to the contact members 55 and 56 of the switch 41, that the member 51 performs in relation to the contacts 53 and 54 of the switch 40. The contacts 55 and 56 engage coöperating contacts 76 and 77 mounted on the insulating base 78 of the switch 41. The members 55 and 56 are also engaged by springs 59 which have a tendency to disengage the members 55 and 56 from companion contacts 76 and 77. The springs 59 and 60 are mounted on pins 79 which engage contacts 80 and 81 mounted on the base 78, the members 55 and 56 being hinged to the contacts by means of the said pins. The switch 41 also includes a hand operated make and break device 82 composed of contacts 83 and 84 pivotally connected as shown at 85 and 86 with contact members 87 and 88 secured to the insulating base 78. The contact parts 83 and 84 are connected by an insulating handle 89 which performs the same function as the similar handle 67 of the make and break device 66. The switch 40 controls the motor circuit, while the switch 41 controls the lamp circuit The path of the current of the motor circuit may be traced from one pole of an electrical source (not shown) through a conductor 90 to the contact 58 of the switch 40, thence through the contact parts 58 and 62, a conductor 91, the contacts 74, 68, and 70, a conductor 92 to a terminal 93 of the motor, thence from the opposite terminal 94 of the motor through a conductor 95 and the contacts 73, 69 and 75, thence through a conductor 96 and contacts 61, 53 and 57, and thence through a conductor 97 to the opposite pole of the said electrical source. The lamp circuit can be traced as follows: from a suitable electrical source (not shown) through a conductor 98, contacts 76, 55, and 80, a conductor 99, contacts 100, 83 and 87, a conductor 101 to a terminal 102 of the lamp 6, thence from a terminal 103 of the lamp through a conductor 104, thence from the said conductor through contacts 88, 84 and 105, a conductor 106, contacts 81, 56 and 77 and a conductor 107 to the opposite pole of the electrical source.

As illustrated in the drawing, the circuit in which the coils of the solenoid 39 are located is taken from the motor circuit and may be termed a shunt or branch circuit. As illustrated in the drawing, a conductor 108 leads from the contact 62 of the switch 40 to a terminal 109 of the member 43 of the solenoid. From the opposite terminal 110 of this member, a conductor 112 leads to a terminal 113 of the member 42 from whose opposite terminal 114 the conductor 37 leads to a terminal 35 of the contact member 30 of the controller. When the circuit is closed, the current passes from the contact member 30 to the swinging contact 28, thence through the screw 34 and the contact 31 to the contact member 33, thence through the conductor 38 to the conductor 95 at a point 115, thence through a part of the conductor 95 to the contact 73, thence through contacts 69 and 75, and conductor 96, the contacts 61, 53, and 57, and the conductor 97 to one pole of the source of the motor circuit, and thence from the opposite pole through the conductor 90, the contacts 58, 54 and 62, and thence to the conductor 108 or point of beginning.

From the foregoing description, the use of our improvement will be readily understood. Assuming that the motor and lamp circuits are both closed and that the film is properly moving through the mechanism 5, the circuit is broken through the controller, the contact 28 being separated from the screw 34 as illustrated in Figs. 3 and 4. Now, if the film breaks, this break will occur between the spool 8 and our controller device in which event the film 10 will escape from its normal position between the rollers 12 and 13, and the said rollers will be brought into direct contact in which event, the lever 14 will be actuated to cause the arm 26 to engage the swinging contact 28 and force the latter into engagement with the contact screw 34 whereby the circuit is closed through the coils of the solenoid 39. The members 42 and 43 of the solenoid will then act to cause the U-shaped core 45 to move downwardly whereby the hook-shaped arm 48 will be disconnected from the rod 50, the latter being equipped with an anti-frictional sleeve rotatably mounted on the rod 50 to facilitate the operation of the device. As soon as this rod is disengaged from the arm 48, the springs 59 of both switches 40 and 41 will act to throw the contact members 53 and 54, and 55 and 56, out of engagement with their companion contact members 57 and 58, and 76 and 77, of the two switches 40 and 41, thus instantly breaking the motor and lamp circuits. It may be stated that when the film 10 is passing between the rolls 12 and 13, the ribs 24 and 25 of the roller 12, are respectively in line with the two rows of perforations A with which the film is provided near its edges. Now if the film should be injured as sometimes happens in the lines of these perforations or either of them, even though it is not actually broken, the roller 12, by virtue of this injury will move sufficiently toward the roller 13 as soon as the ribs 24 approach the broken portion of the film, to close the circuit through the solenoid 39 and stop the operation of the projecting mechanism until the film circuit can be repaired. This is important, since if a film of this character is not promptly repaired it will lead to inaccuracy in the travel of the film and consequent serious and disastrous injury thereto as soon as the injured part of the film comes in contact with the actuating sprockets of the mechanism 5.

Our present invention is of sufficient scope to cover the means controlled by the film for rendering the appearance described, or any other projecting apparatus, inoperative whenever the film breaks, or is mutilated, as aforesaid.

Having thus described our invention, what we claim is:

1. The combination with a projecting apparatus and a film, of controlling means, including a pair of rollers engaged by the film and normally held apart but adapted to engage each other when the film is mutilated, whereby the apparatus is automatically rendered inactive.

2. The combination with a moving picture projecting apparatus and a film having longitudinally disposed rows of perforations, of means controlled by the film for automatically rendering the apparatus inactive when the film is mutilated along the lines of perforations, said means including a pair of coöperating rollers between which the film normally passes, the said rollers being respectively provided with circumferential grooves and ribs so arranged that they are in line with the rows of perforations of the film.

3. In an apparatus of the class described, the combination with an electric lamp, a motor, circuits in which the lamp and motor are located, and make and break devices located within the respective circuits, of controlling means including a pair of rollers engaged by the film and normally held apart but adapted to engage each other when the film is mutilated along the lines of perforations, whereby the apparatus is automatically rendered inactive.

4. In an apparatus of the class described, the combination with an electric lamp, a motor, circuits in which the lamp and motor are located, and make and break devices located within the respective circuits, of controlling means including a pair of coöperating rollers respectively provided with circumferential grooves and ribs, the said rollers being normally engaged by the film, but when the latter is broken, the ribs of one roller will engage the grooves of the other roller, whereby the apparatus is rendered inactive.

5. The combination with an electro-magnetic device, and a circuit in which the latter is located, of controlling means including a pair of rollers engaged by the film and normally held apart to maintain the said circuit open, but adapted to engage each other when the film is broken, whereby the circuit is automatically closed.

6. The combination with a moving picture projecting apparatus, including a lamp, of controlling means including a pair of rollers engaged by the film and normally held apart but adapted to engage each other when the film is mutilated, whereby the lamp is automatically extinguished.

In testimony whereof we affix our signatures in presence of two witnesses.

LEE ROY KENNEDY.
OSCAR B. OLSON.

Witnesses:
ANNA L. LEHMAN,
A. J. O'BRIEN.